US012660815B2

(12) United States Patent　　　(10) Patent No.:　US 12,660,815 B2

Hil　　　　　　　　　　　　　　　(45) Date of Patent:　Jun. 23, 2026

(54) VESSEL FOR STORING AND TRANSPORTING A LIVING ORGAN

(71) Applicant: BEST MATCH CORPORATION, Greenwich, CT (US)

(72) Inventor: Garet Hil, Greenwich, CT (US)

(73) Assignee: BEST MATCH CORPORATION, Greenwich, CT (US)

( * ) Notice: Subject to any disclaimer, the term of this patent is extended or adjusted under 35 U.S.C. 154(b) by 0 days.

(21) Appl. No.: 18/746,165

(22) Filed: Jun. 18, 2024

(65) Prior Publication Data

US 2025/0380685 A1　　Dec. 18, 2025

(51) Int. Cl.
| *A01N 1/148* | (2025.01) |
| *B65D 25/02* | (2006.01) |
| *B65D 25/30* | (2006.01) |
| *B65D 43/02* | (2006.01) |
| *B65D 55/14* | (2006.01) |
| *B65D 77/04* | (2006.01) |
| *B65D 81/38* | (2006.01) |

(52) U.S. Cl.
CPC ............. *A01N 1/148* (2025.01); *B65D 25/02* (2013.01); *B65D 25/30* (2013.01); *B65D 43/0202* (2013.01); *B65D 55/14* (2013.01); *B65D 77/0453* (2013.01); *B65D 81/3813* (2013.01); *B65D 2543/00194* (2013.01)

(58) Field of Classification Search
None
See application file for complete search history.

(56) References Cited

U.S. PATENT DOCUMENTS

| 4,745,759 | A | * | 5/1988 | Bauer ...................... F25B 21/02 |
| | | | | 435/284.1 |
| 6,604,390 | B1 | * | 8/2003 | Nooner .................. A47G 29/20 |
| | | | | 70/30 |
| 2008/0145919 | A1 | * | 6/2008 | Franklin .............. A01N 1/0252 |
| | | | | 435/284.1 |
| 2017/0027386 | A1 | * | 2/2017 | Bungard ............. A47J 41/0055 |
| 2018/0015938 | A1 | * | 1/2018 | DeFrancia ............. B65D 25/04 |
| 2020/0115136 | A1 | * | 4/2020 | Sanchez Gironell .. B65D 81/18 |
| 2021/0229893 | A1 | * | 7/2021 | Maldonado ........ B65D 81/3823 |

FOREIGN PATENT DOCUMENTS

| WO | WO-9935453 A1 | * | 7/1999 | .............. A01N 1/02 |
| WO | WO-0218210 A1 | * | 3/2002 | ............. A01N 1/165 |

* cited by examiner

*Primary Examiner* — Michael A Marcheschi
*Assistant Examiner* — Nathan G Esperon
(74) *Attorney, Agent, or Firm* — Shore IP Group, PLLC; Sean R. Wilsusen

(57)　　　　　　　ABSTRACT

A vessel for transporting a living organ includes a container having an open top end and a closed bottom end, and a lid configured to selectively cover the open top end of the container and seal an inner chamber. The container includes a rigid outer housing, a rigid inner housing positioned within the rigid outer housing, and an insulating layer. The rigid inner housing defines the inner chamber, which is configured to hold a living organ. The rigid inner housing and the rigid outer housing define a closed cavity therebetween, in which the insulating layer is positioned.

4 Claims, 8 Drawing Sheets

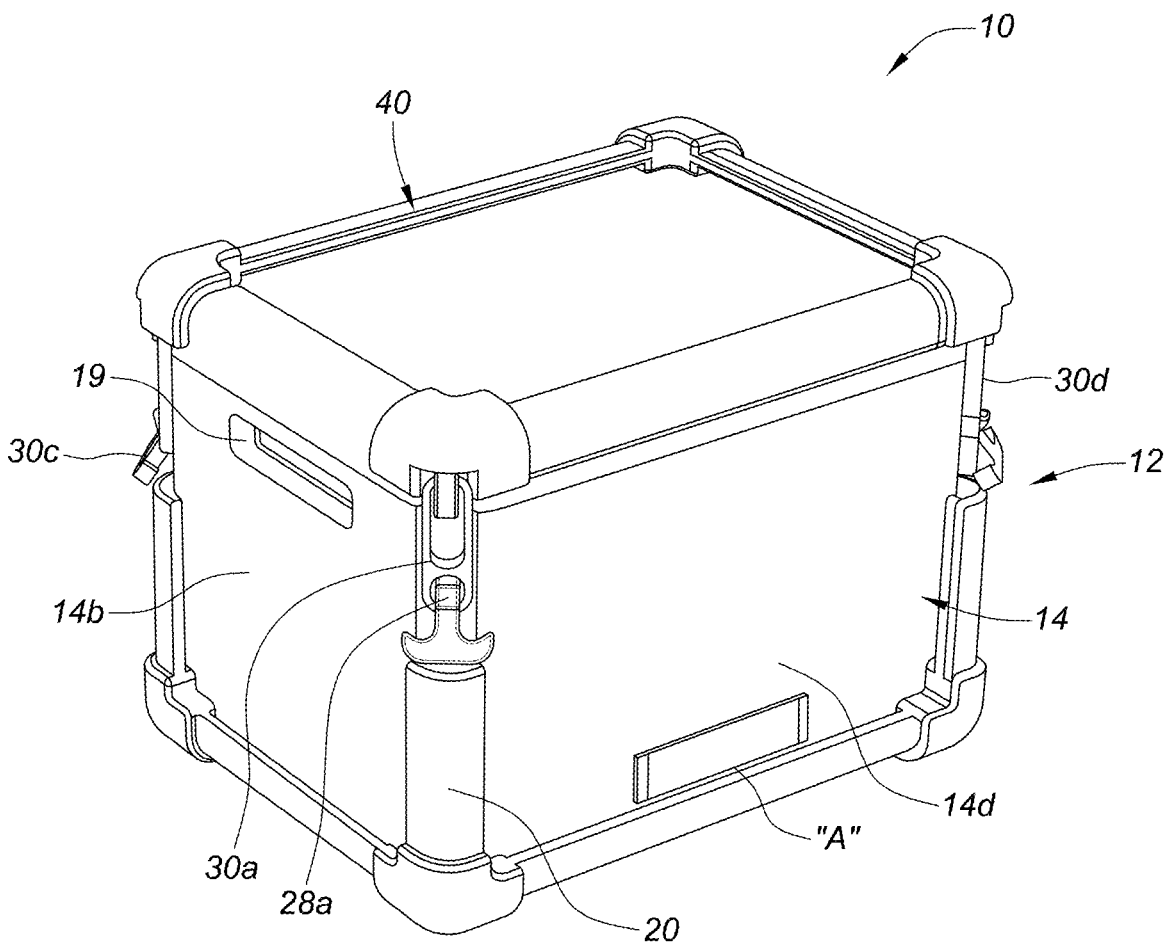
_FIG. 1_

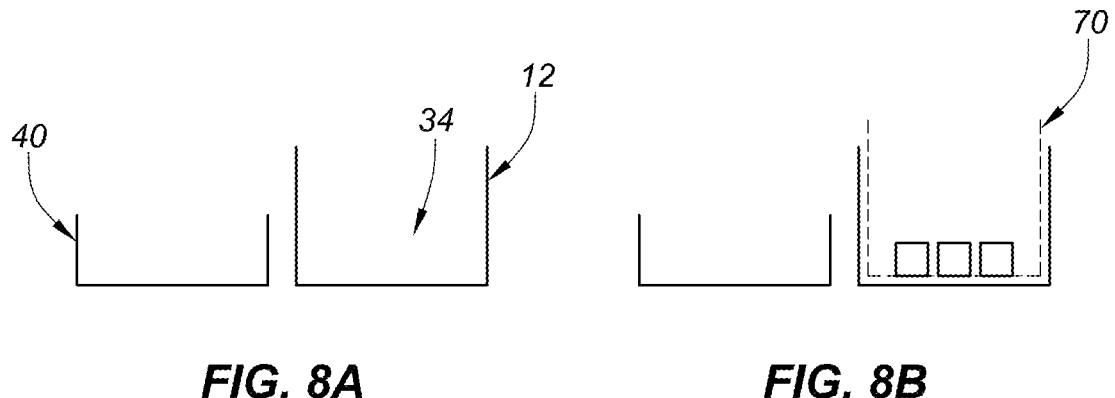
FIG. 8A　　　　FIG. 8B
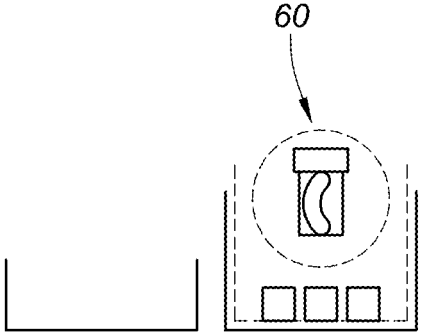
FIG. 8C
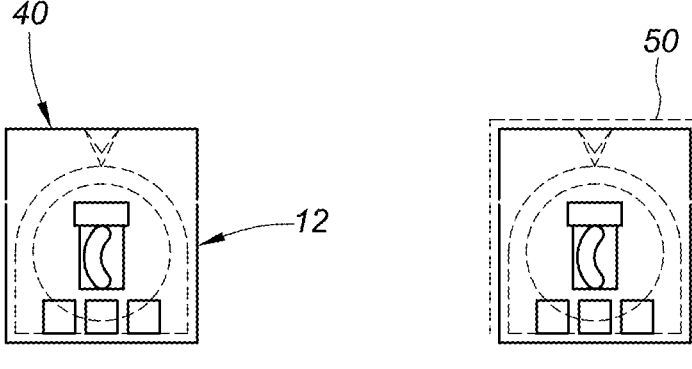
FIG. 8D　　　　FIG. 8E

VESSEL FOR STORING AND TRANSPORTING A LIVING ORGAN

FIELD

The present disclosure relates to an insulating, protective vessel and, more particularly, to a device, system, and method of storing and transporting a living organ (e.g., a kidney).

BACKGROUND

Portable vessels for storing temperature-sensitive products (e.g., medicine or organs) in a cooled state typically include a main cooler body and a lid for selectively closing an inner chamber of the main cooler body. However, some portable vessels may not comply with the standards set by the Organ Procurement and Transplantation Network (OPTN) while also adequately protecting its contents during transport, discouraging opening of the vessel by unauthorized personnel, preventing leakage, maintaining sterility during transport, allowing for ease of tracking, and/or maintaining the temperature of its contents below the required threshold.

SUMMARY

The present disclosure provides a vessel for storing and transporting a living organ, such as, for example, a kidney. The vessel has a hardshell design with rigid plastic encapsulating an inner insulative layer, a pocket located next to an inner organ cavity for storing GPS and/or a document (e.g., a donor ID, donor blood type, description of the contents of the vessel), handles that are built into the hardshell design, and an optional clear plastic bag. In aspects of the present disclosure, a red biohazard bag may not be needed.

Provided in accordance with aspects of the present disclosure is a vessel for transporting a living organ. The vessel may be a system that includes a container having an open top end and a closed bottom end, and a lid configured to selectively cover the open top end of the container and seal an inner chamber of the container. The container includes a rigid outer housing, a rigid inner housing positioned within the rigid outer housing, and an insulating layer. The rigid inner housing defines the inner chamber, which is configured to hold a living organ. The rigid inner housing and the rigid outer housing define a closed cavity therebetween, and the insulating layer is positioned in the closed cavity.

In an aspect of the present disclosure, the container may define a pocket positioned between the rigid outer housing and the rigid inner housing. The pocket may be configured to hold a paper document and/or a tracking device.

In an aspect of the present disclosure, the container may include a top surface extending horizontally between the rigid outer housing and the rigid inner housing. The pocket may be defined in the top surface and may extend toward the closed bottom end of the container.

In an aspect of the present disclosure, the pocket and the inner chamber may be isolated from one another.

In an aspect of the present disclosure, the lid may include a rigid outer housing defining a closed cavity therein, and an insulating layer encapsulated in the closed cavity of the lid.

In an aspect of the present disclosure, the lid may include a plurality of latches configured to detachably secure the lid to the rigid outer housing.

In an aspect of the present disclosure, the rigid outer housing may have a plurality of elongated recesses positioned adjacent respective corners of the rigid outer housing. The plurality of latches may be configured to extend within the respective elongated recesses.

In an aspect of the present disclosure, the rigid outer housing may have a plurality of connectors configured to selectively secure to the respective latches.

In an aspect of the present disclosure, one or more of the connectors may define a channel configured to receive a line that extends around an end of one of the latches to prevent detachment of the latch from the rigid outer housing.

In an aspect of the present disclosure, the lid and the rigid outer housing may each have a front side and an opposing rear side. The rear side of the lid may be hingedly coupled to the rear side of the rigid outer housing, and the front side of the lid may be detachably coupled to the front side of the rigid outer housing via at least one key lock.

In an aspect of the present disclosure, the container may include a top surface that extends horizontally between the rigid outer housing and the rigid inner housing. The container may further include a gasket positioned in a recess formed in the top surface such that the gasket forms a fluid-tight seal with the container and the lid.

In an aspect of the present disclosure, the vessel may further include a corrugated plastic box configured for receipt of the container, an organ jar configured for receipt in the inner chamber, and/or a plastic bag configured for receipt in the inner chamber and for encapsulating the organ jar.

In an aspect of the present disclosure, the rigid outer housing may define a pair of handles in opposite short sides thereof.

Provided in accordance with further aspects of the present disclosure is a vessel for transporting a living organ. The vessel includes a rigid outer housing, a rigid inner housing positioned within the rigid outer housing, an insulating layer positioned between the rigid outer housing and the rigid inner housing, a pocket formed between the rigid outer housing and the rigid inner housing, and a lid. The rigid inner housing defines an inner chamber configured to hold a living organ. The lid is configured to selectively cover the pocket and the inner chamber. The pocket is configured to hold at least one of a paper document or a tracking device and is isolated from the inner chamber.

In an aspect of the present disclosure, the rigid outer housing may have a plurality of connectors configured to selectively secure to a respective plurality of latches. One or more of the connectors may define a channel configured to receive a line that extends around an end of one of the latches to prevent detachment of the latch from the rigid outer housing.

In an aspect of the present disclosure, the vessel may further include a rigid top surface extending horizontally between the rigid outer housing and the rigid inner housing. The rigid top surface may define a recess therein. The vessel may further include a gasket positioned in the recess and configured to form a fluid-tight seal between the top surface and the lid.

Provided in accordance with further aspects of the present disclosure is a method of transporting a living organ with a vessel. The method includes partially filling an inner chamber of a rigid container of the vessel with ice; positioning an organ jar containing a living organ into the inner chamber; positioning at least one of a paper document or a tracking device in a pocket of the rigid container; sealing the inner chamber and the pocket with a lid; applying an Organ Procurement and Transplantation Network (OPTN) label on an outer surface of the rigid container; and positioning the rigid container within a corrugated box. The pocket may be isolated from the inner chamber.

BRIEF DESCRIPTION OF THE DRAWINGS

Various aspects and features of the present disclosure are described hereinbelow with reference to the drawings wherein:

FIG. 1 is a perspective view of an exemplary embodiment of a vessel for transporting a living organ according to aspects of the present disclosure;

FIGS. 8A-8E are schematic drawings of consecutive steps of an exemplary method of using the vessel system of the present disclosure.

DETAILED DESCRIPTION

Figure 2:
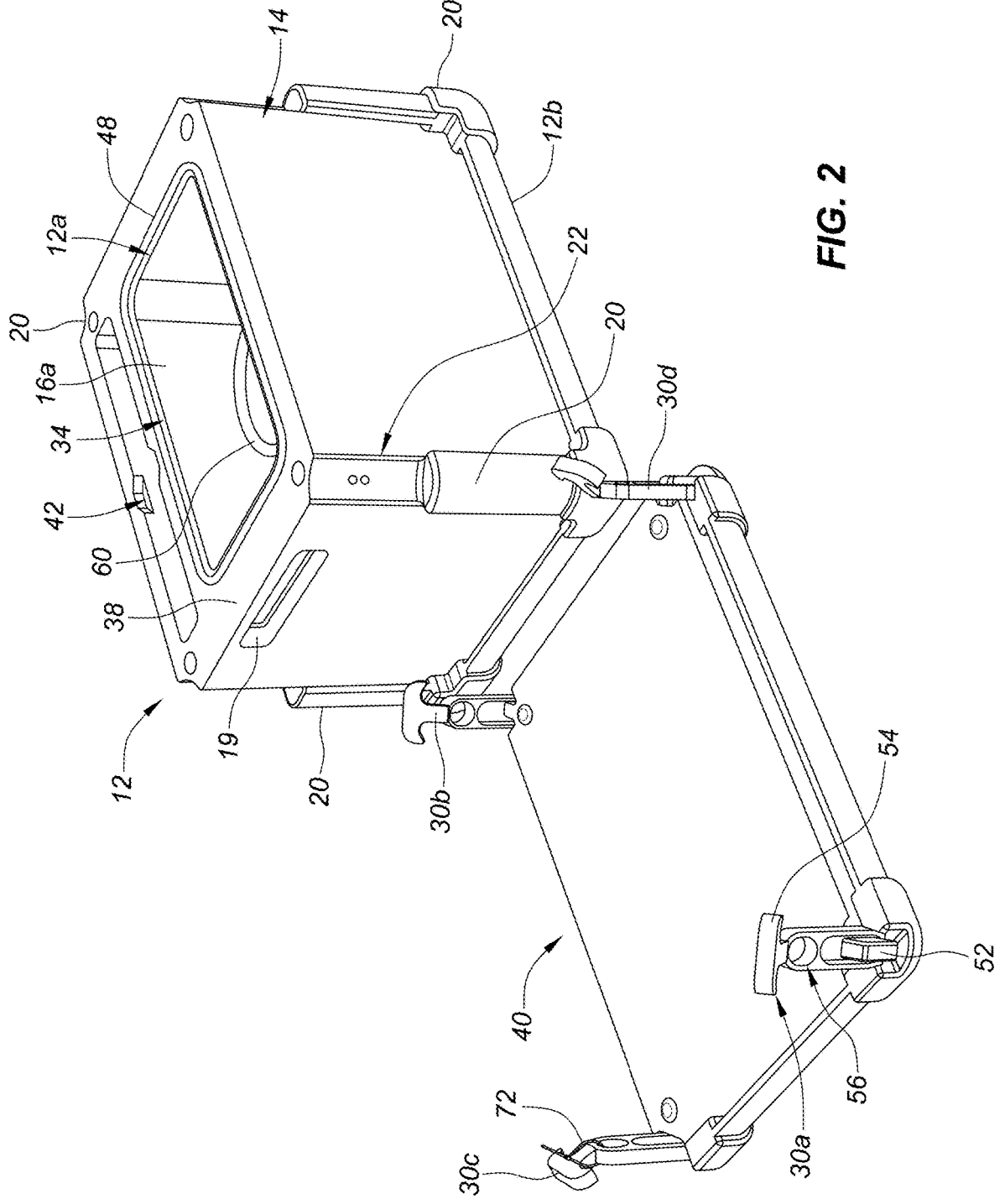
FIG. 2 is a perspective view, with parts separated, of the vessel of FIG. 1.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Figure 7:
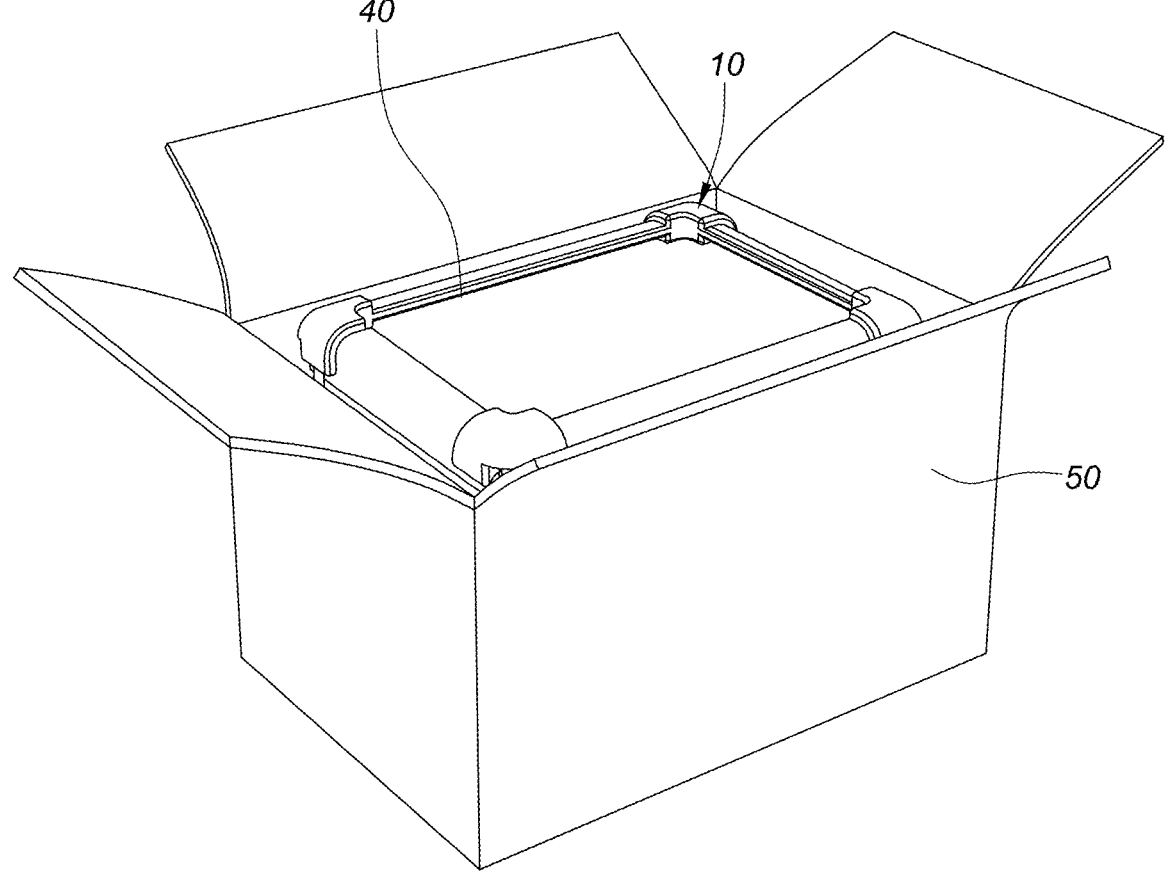
FIG. 7 is a perspective view of the vessel of FIG. 1 positioned in a corrugated box.

Referring particularly to FIGS. 1-4B, a vessel or vessel system 10 for storing and transporting a living organ, such as, for example, a kidney, is provided. The vessel 10 generally includes a container 12 and a lid 40 operably coupled to the container 12 by a plurality of latches 30a, 30b, 30c, 30d (collectively referred herein as latches 30). In aspects of the present disclosure, the vessel 10 may be a system that also includes a corrugated plastic box 50 (FIG. 7) configured for receipt of the container 12 and lid 40, an organ jar 60 (FIG. 1) configured for receipt in the container 12, and an optional plastic bag 70 (FIG. 8B) configured for receipt in the container 12 and for encapsulating the organ jar 60.

The container 12 has an open top end 12a and a closed bottom end 12b and generally includes a rigid outer housing 14 (FIG. 3), a rigid inner housing 16 (FIG. 3) positioned within the rigid outer housing 14, and an insulating layer 18 positioned between the rigid outer housing 14 and the rigid inner housing 16. The rigid outer housing 14 has a pair of opposing short sides 14a, 14b and a pair of opposing long sides 14c, 14d each extending upwardly from and monolithically formed with the bottom end 12b of the container 12. Each of the short sides 14a, 14b has a handle 19 formed therein configured to be grasped by a hand of a carrier. The rigid outer housing 14 may have a rectangular shape, but other suitable shapes are contemplated.

The rigid outer housing 14 has four corners 20 that interconnect respective short and long sides 14a, 14b and 14c, 14d to one another and extend along a height of the container 12 between the opened top end 12a and the closed bottom end 12b. Each of the corners 20 may define an elongated recess 22 therein configured to receive a distal end portion 54 of a respective latch 30 such that the latches 30 are flush or substantially flush with an exterior surface of the rigid outer housing 14. The exterior surface of the rigid outer housing 14 may have a demarcated area "A" (FIG. 1) configured for placement of a label that contains information about the contents of the vessel 10.

The rigid outer housing 14 has a plurality of connectors 28 configured to selectively secure to the respective plurality of latches 30. Each connector 28 may be positioned within a respective elongated recess 22 of the corners 20. One or more of the connectors 28, for example, connector 28a (FIGS. 3 and 4A), may be a projection (e.g., a squared projection) configured for receipt in a corresponding opening of a respective latch 30. One or more of the connectors 28, for example, connector 28b (FIG. 4B), may be a pair of projections that define a gap 66 (FIGS. 5A and 5B) therebetween configured for receipt of a distal end of a latch 30.

The rigid inner housing 16 of the container 12 may have a similar shape as the rigid outer housing 14, but with smaller dimensions such that a space or cavity 34 is formed between the rigid outer housing 14 and the rigid inner housing 16. The insulating layer 18 fills the cavity 34 and is enclosed on all sides by the rigid outer and inner housings 12, 14. The rigid outer housing 14 and the rigid inner housing 16 may be injection molded around the insulating layer 18 such that the rigid outer and inner housings 14, 16 form a monolithic structure. The rigid inner housing 14 defines an inner chamber 34 configured to hold a living organ. In aspects of the present disclosure, the inner chamber 34 may be rectangular and have a total volume of about 450 $in^2$ to about 490 $in^2$, and In aspects of the present disclosure about 471.95 $in^2$. In aspects of the present disclosure, the inner chamber 34 may have a length of about 10.3 in, height of about 5.8, and a height of about 7.9 in.

Figure 3:
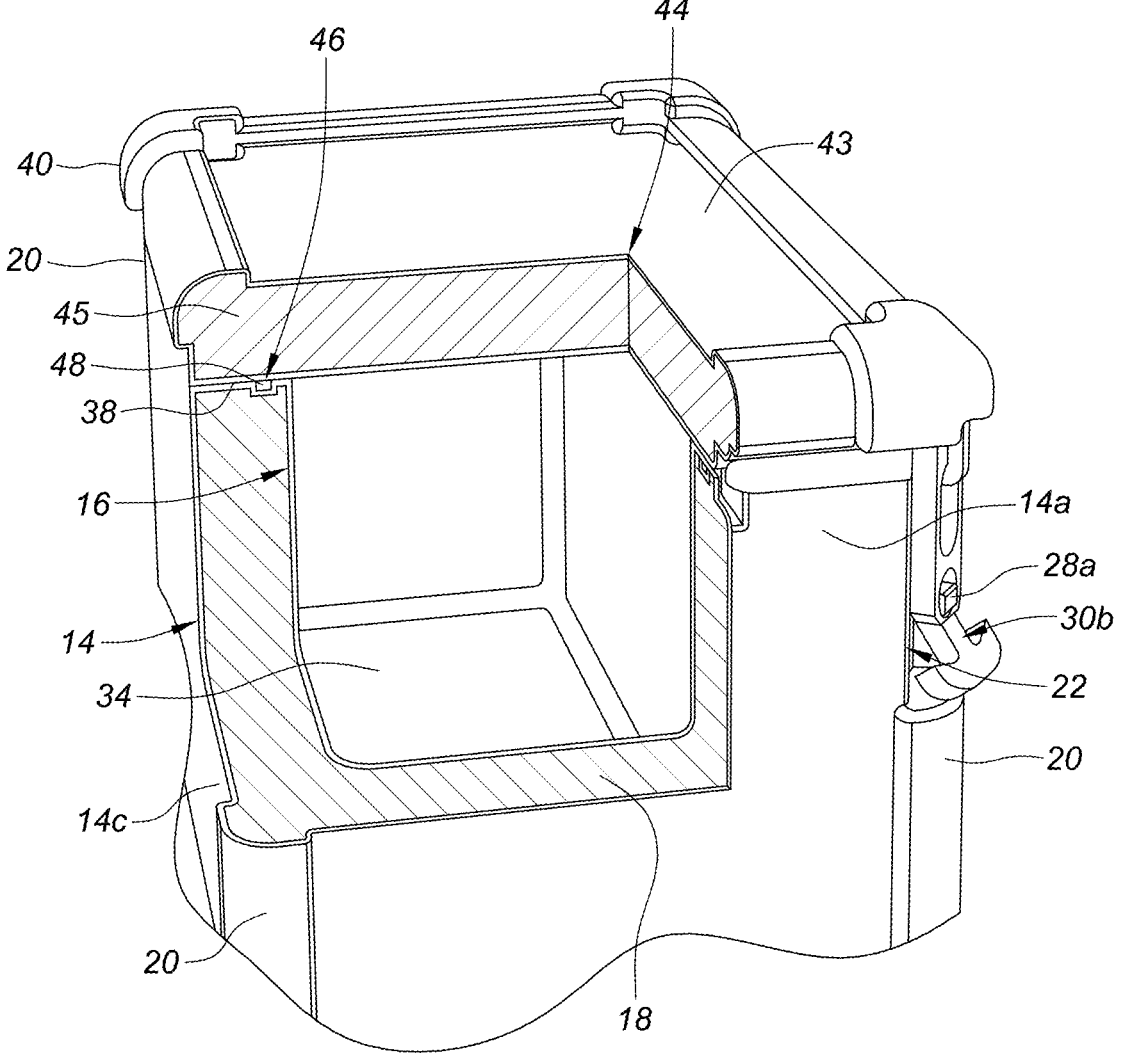
FIG. 3 is a cutaway view illustrating components of the vessel of FIG. 1

With reference to FIGS. 2 and 3, the container 12 further includes a flat, top surface 38 extending horizontally between top ends of the rigid outer housing 14 and the rigid inner housing 16. The top surface 38 defines a pocket 42 therein positioned between the long side or rear wall 14c of the rigid outer housing 14 and a rear wall 16a of the rigid inner housing 16. The pocket 42 is lined with the same rigid plastic material as the rigid outer and inner housings 14, 16 and extends from the top surface 38 toward the closed bottom end 12b of the container 12. The pocket 42 is configured to hold at least one of a paper document or a tracking device (e.g., a GPS tracking device). The pocket 42 and the inner chamber 34 are fluidly isolated from one another such that fluids within the inner chamber 34 cannot leak into the pocket 42.

The top surface 38 of the container 12 further defines a shallow recess 46 therein that extends around the entire perimeter of the rigid inner housing 14. A gasket 48 is positioned in the recess 46 such that the gasket 48 forms a fluid-tight seal with the container 12 and the lid 40. The gasket 48 is positioned concentrically between the pocket 42 and the inner chamber 34, whereby the gasket 48 fluidly isolates the pocket 42 from the inner chamber 34.

In aspects of the present disclosure, the rigid outer and inner housings 14, 16 and the top surface 38 may be fabricated from a rigid plastic material, such as, for example, medical grade polyvinyl chloride. Other rigid materials are also contemplated, such as, for example, polystyrene, polypropylene, or polyethylene.

With reference to FIGS. 2-5B, the lid 40 is configured to selectively cover the open top end 12*a* of the container 12 and seal the inner chamber 34 and the pocket 42. The lid 40 includes a rigid outer shell 43 defining a closed cavity 44 therein, and an insulating layer 45 encapsulated in the closed cavity 44 of the lid 40. Each of the plurality of latches 30 of the lid 40 has a proximal end portion 52 fixed to a respective corner of the lid 40, and a distal end portion 54 configured to detachably couple to a respective corner 40 of the rigid outer housing 14 to detachably secure the lid 40 to the rigid outer housing 14. For example, with reference to FIGS. 2 and 4A, one or more of the latches 30, such as, for example, latch 30*a*, has a distal end portion 54 defining an aperture 56 configured to receive the connector 28*a* of the rigid outer housing 14.

Figure 4B:
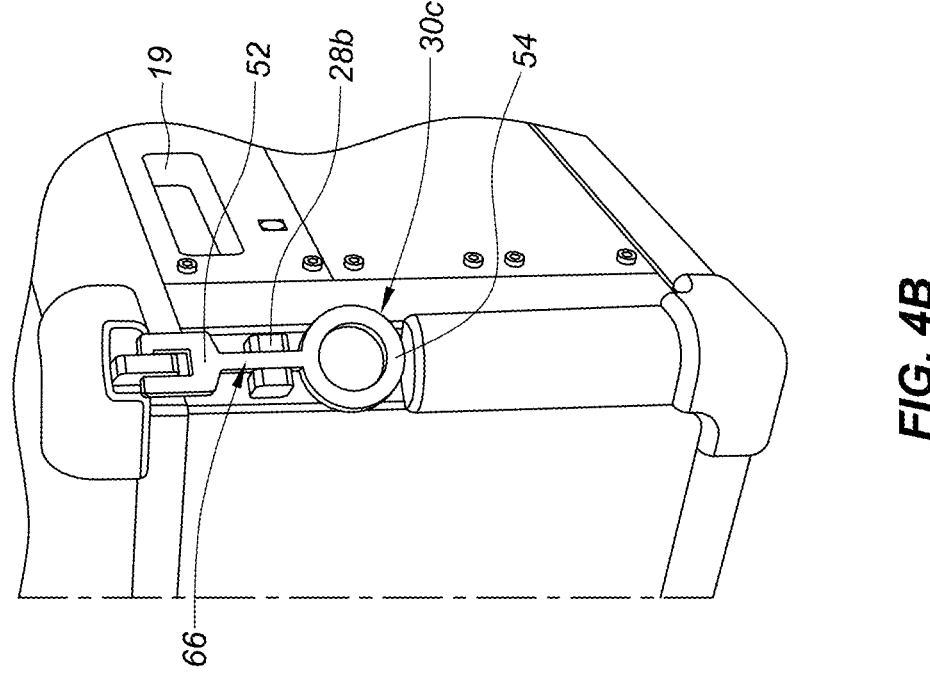
FIG. 4B is a side perspective view of the vessel of FIG. 1.
Figure 4A:
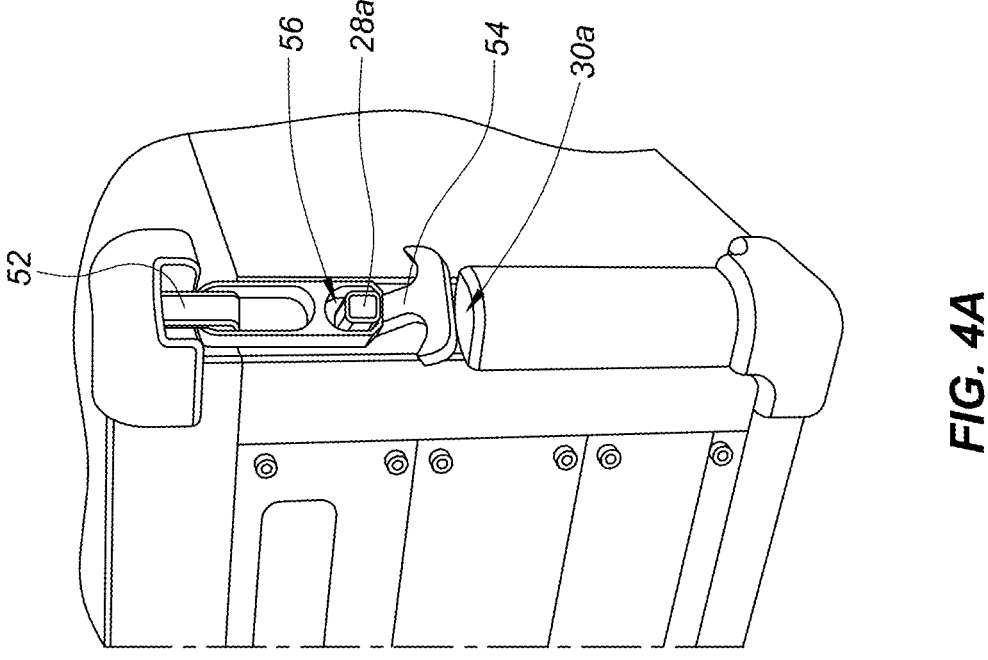
FIG. 4A is a front perspective view of the vessel of FIG. 1.
Figures 5A, 5B:
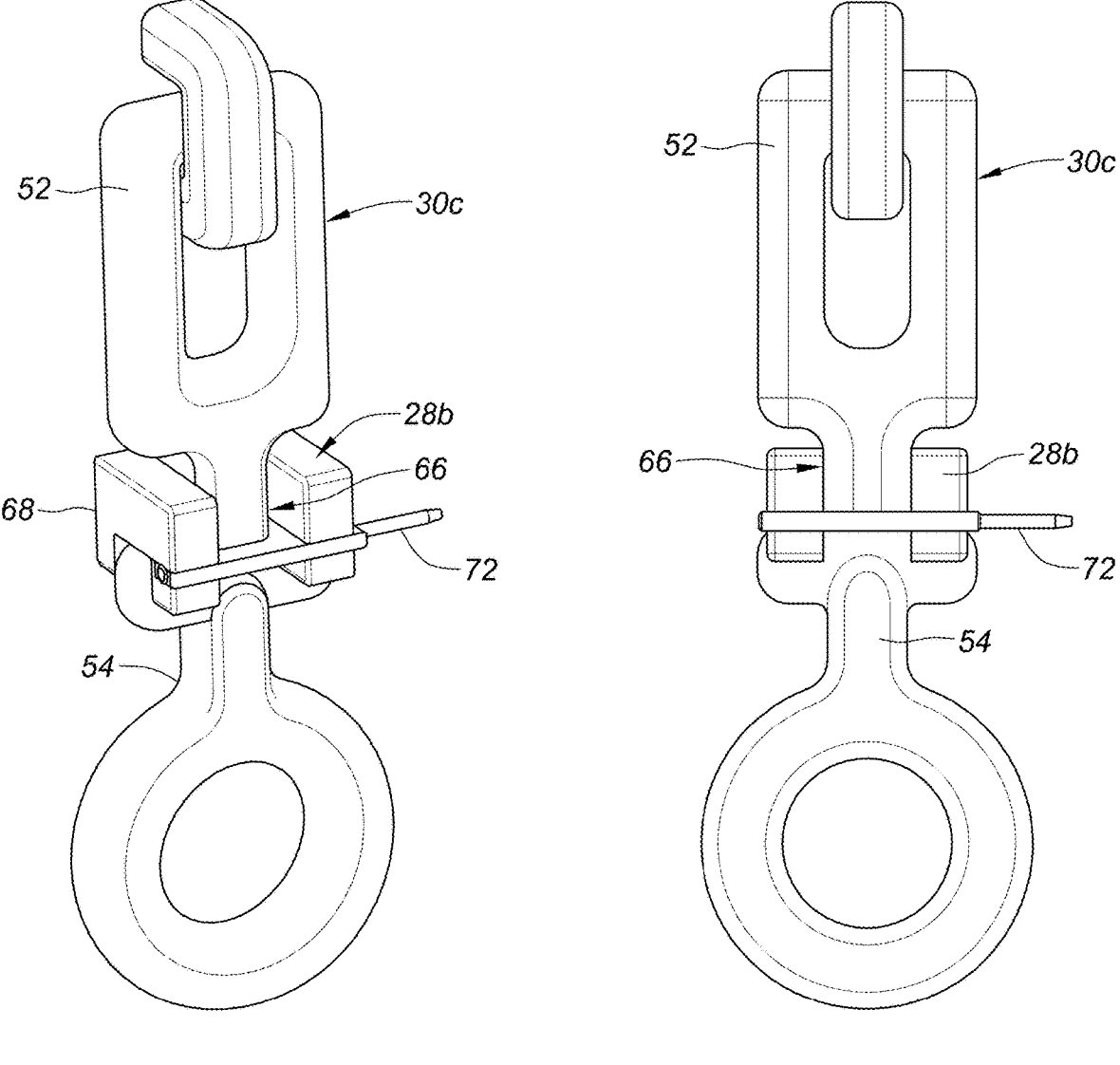
FIG. 5A is a perspective view of a latch of the vessel of FIG. 1.
FIG. 5B is a plan view of the latch of FIG. 5A.

In another aspect, with reference to FIGS. 4B, 5A, and 5B, one or more of the latches 30, such as, for example, latch 30*c*, may have a distal end portion 54 configured to be frictionally received in the gap 66 between the pair of projections of the connector 28*b*. The connector 28*b* may define a channel 68 configured to receive a line 72 that extends around the latch 30*c* to prevent detachment of the distal end portion 54 of the latch 30*c* from the rigid outer housing 14. The channel 68 may extend through each of the pair of projections of the connector 28*b*. The line 72 may be a tie-wrap, cable, string, wire, or the like, and extends through the channel 68 and between the latch 30*c* and the rigid outer housing 14. As such, the latch 30*c* cannot be detached from the connector 28*b* without first severing the line 72.

In aspects of the present disclosure, distal ends of the latches 30 may assume any suitable shape, such as, for example, a round or oblong ring-shape or an anchor-shape.

Figure 6:
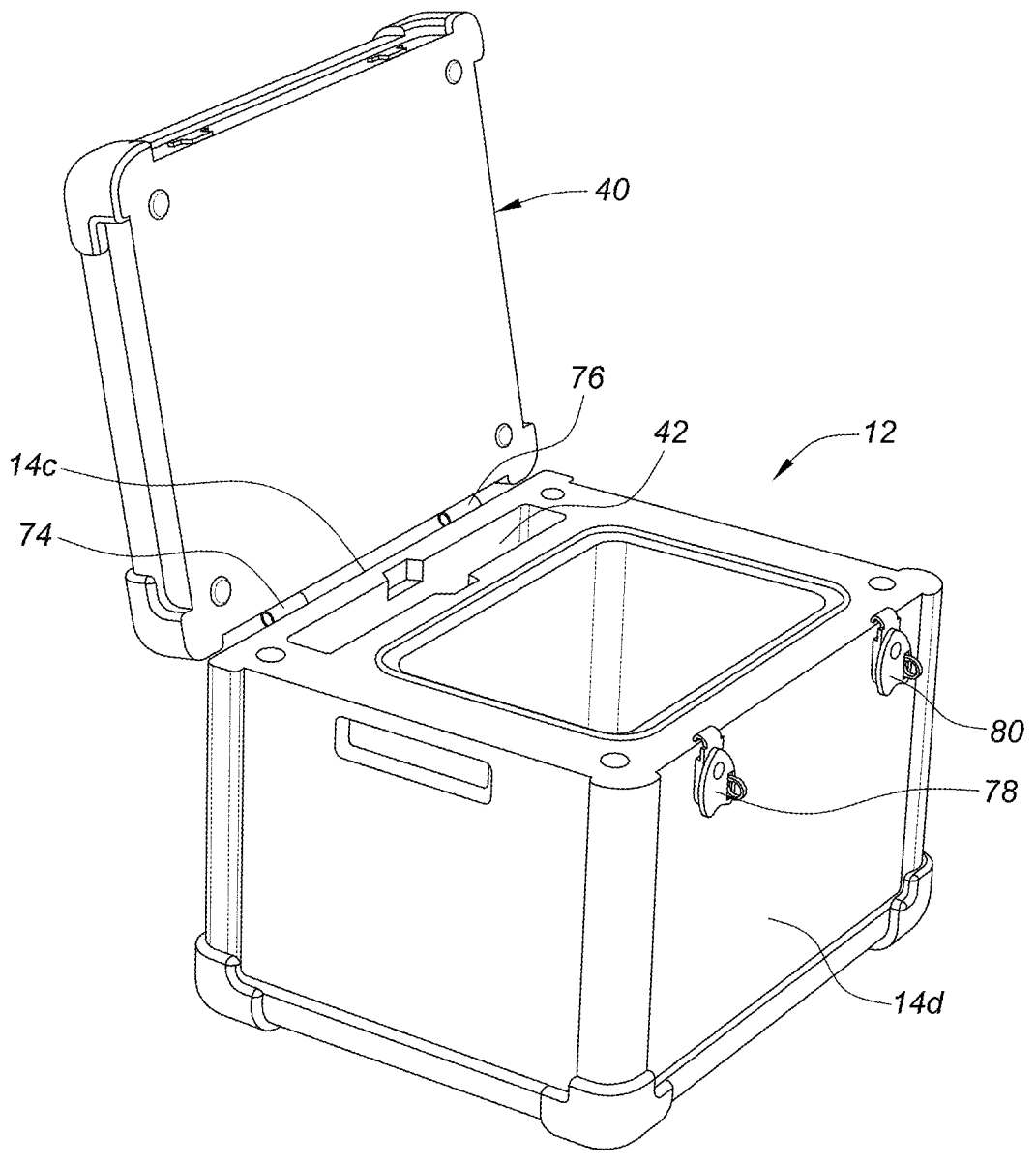
FIG. 6 is a side perspective view of another embodiment of a vessel with a lid thereof in an opened configuration.

In one embodiment, as shown in FIG. 6, the container 12 may include a pair of hinges 74, 76 positioned at the rear wall 14*c* of the rigid outer housing 14, and a pair of key locks 78, 80 at the front wall 14*d* of the rigid outer housing 14 for selectively locking the lid 40 to the container 12. In aspects of the present disclosure, any suitable combination of latches, hinges, and key locks may be utilized.

The empty weight of the container 12 with lid 40 (not including the tracking device or organ jar) may be about 1.8 to 2.3 pounds, and in some aspects of the present disclosure about 2.14 pounds, and the weight with ice may be about 8.28 pounds. The estimated time-to-melt is a minimum of about 45-55 hours, and in some aspects of the present disclosure about 50 hours. Other suitable weights, dimensions, and minimum melt times are also contemplated.

In operation, with reference to FIGS. 8A-8E, an organ (e.g., a kidney) may be recovered from a donor and the vessel 10 (e.g., the container 12 with lid 40) is placed on a back table of an operating room. In step 1, as shown in FIG. 8A, the lid 40 of the vessel 10 is opened to uncover the open top end 12*a* of the container 12. Sterile components and, if used, the clear plastic bag, are removed from the vessel 10, and the sterile components are transferred to a sterile field. In step 2, as shown in FIG. 8B, the inner chamber 34 is partially filled with ice or any other suitable frozen substance. In one aspect, an optional plastic bag 70 may be filled with ice, which is then positioned into the inner chamber 34. In step 3, as shown in FIG. 8C, the living organ may be prepped for transport and the organ jar 60 and other barriers are positioned into the inner chamber 34 onto the ice. Additional ice may be poured over the organ jar 60. One or more paper documents and a tracking device may be positioned in the pocket 42 (FIG. 2) of the container 12 at any suitable time.

In step 4, as shown in FIG. 8D, the inner chamber 34 and the pocket 42 are sealed by closing the lid 40. The latches 30, locks 80, and/or lines 72 may be used to lock the lid 40 to the container 12, thereby deterring and inhibiting unauthorized personnel from opening the vessel 10. An Organ Procurement and Transplantation Network (OPTN) label may be applied on the outer surface of the rigid outer housing 12. As shown in FIG. 8E, the container 12, with the lid 40 in the locked state, may be positioned within the corrugated box 50.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A vessel for transporting a living organ, the vessel comprising:

a rigid outer housing;

a rigid inner housing positioned within the rigid outer housing and defining an inner chamber configured to hold a living organ;

an insulating layer positioned between the rigid outer housing and the rigid inner housing;

a pocket formed between the rigid outer housing and the rigid inner housing and configured to hold at least one of a paper document or a tracking device, wherein the pocket and the inner chamber are isolated from one another; and a lid configured to selectively cover the pocket and the inner chamber, wherein, when closed and covering the pocket and the inner chamber, the lid opposes a bottom end of the vessel in a first direction, wherein the lid includes a plurality of latches configured to detachably secure the lid to the rigid outer housing, wherein the rigid outer housing has a plurality of connectors configured to selectively secure to the respective plurality of latches, at least one connector of the plurality of connectors defining a channel configured to receive a line that extends around a portion of at least one latch of the plurality of latches to prevent detachment of the at least one latch from the rigid outer housing, wherein the channel is defined in the at least one connector and opens laterally relative to a side wall of the rigid outer housing, the channel extending through each of a pair of projections of the connector, wherein the pair of projections define a gap therebetween configured to frictionally receive a distal end portion of the at least one latch, wherein the line is received into and extends lengthwise through the channel in a second direction that is perpendicular to the first direction, the distal end portion of the at least one latch is received into the gap in the first direction, and the first direction extends from the bottom end of the vessel toward the lid.

2. The vessel according to claim 1, wherein the lid includes:

a second rigid outer housing defining a closed cavity therein; and an insulating layer encapsulated in the closed cavity of the lid.

3. The vessel according to claim 1, further comprising:

a rigid top surface extending horizontally between the rigid outer housing and the rigid inner housing, the rigid top surface defining a recess therein; and a gasket positioned in the recess and configured to form a fluid-tight seal between the rigid top surface and the lid.

4. The vessel according to claim 1, wherein the rigid outer housing defines a pair of handles in opposite short sides thereof.

\*　\*　\*　\*　\*